S. E. REAGLES.
ROPE COUPLING.
APPLICATION FILED JAN. 15, 1913.
1,079,881.
Patented Nov. 25, 1913.
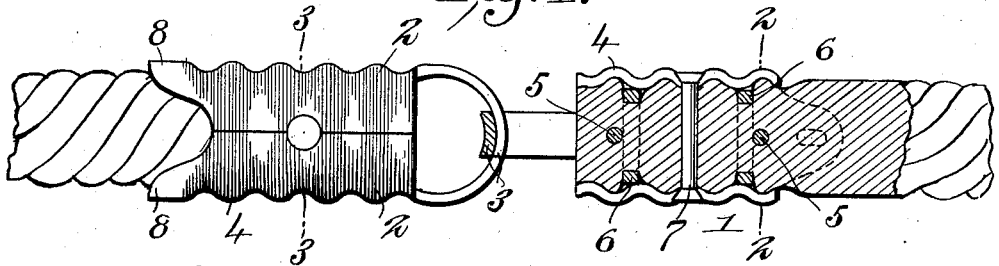
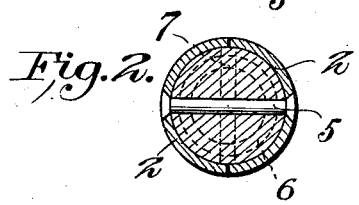
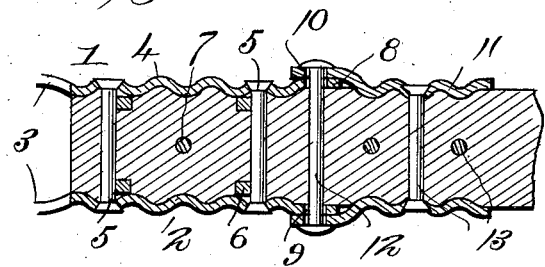
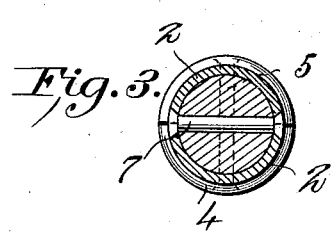
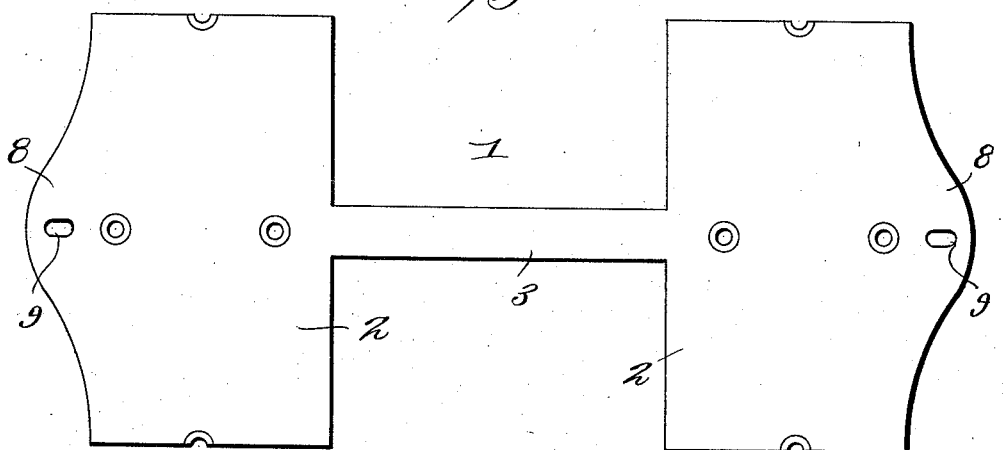
Witnesses
Carroll Bailey
James R. ...
Inventor
Samuel E. Reagles,
By Victor J. Evans
Attorney
COLUMBIA PLANOGRAPH CO., WASHINGTON, D. C.

UNITED STATES PATENT OFFICE.

SAMUEL E. REAGLES, OF BARABOO, WISCONSIN.

ROPE-COUPLING.

1,079,881.  Specification of Letters Patent.  Patented Nov. 25, 1913.

Application filed January 15, 1913. Serial No. 742,248.

*To all whom it may concern:*

Be it known that I, SAMUEL E. REAGLES, a citizen of the United States, residing at Baraboo, in the county of Sauk and State of Wisconsin, have invented new and useful Improvements in Rope-Couplings, of which the following is a specification.

This invention relates to belt fasteners and particularly to couplings for connecting the respective terminals of a rope belt.

The object of the invention is to provide a device of this character which will include companion coupling elements which are substantially identically constructed and adapted for association relatively and to be connected with said terminals of the rope whereby to hold the latter in belt form.

Another object of the invention is to provide a coupling device which will include extensible portions and main body portions whereby the device may be made to accommodate itself to a belt which is to be subjected to a prescribed strain and thereby positively prevent the rope ends from becoming casually disconnected from the coupling.

A further object of the invention is the provision of fastening rivets connecting the socket members of the coupling with the rope ends and bands embracing the rope ends and associated with the rivets whereby the latter form stops to resist the withdrawing tendency of the rope ends from the sockets.

With these and other objects in view, the invention consists of certain novel features of construction, combination and arrangement of parts, as will be hereinafter described and claimed.

In the accompanying drawings:—Figure 1 is a side view of the coupling, showing the same operatively connected with the respective terminals of a rope belt, one of the members of the coupling being shown in longitudinal section; Fig. 2 is a section on line 2—2 of Fig. 1; Fig. 3 is a section on line 3—3 of Fig. 1; Fig. 4 is a view similar to Fig. 1, showing the application of the extensions thereto; and Fig. 5 is a plan view of one of the blanks from which the coupling member of the socket is formed.

The device comprises companion identically constructed socket members 1, which are each formed from a single piece of flat sheet metal stamped to provide jaws 2, which are connected together through a bight portion or loop 3, the loop of one of the members being threaded through the loop of the other member whereby both members are connected for angular movements relatively to thereby accommodate themselves to the peripheral surface of the pulley over which the belt passes.

The jaws 2 are corrugated circumferentially, as at 4, to maximize their locking efficiency when advanced against the rope ends. The companion jaws of each member are connected together by rivets 5 which completely extend through the rope ends. The rope ends are provided with fixed collars 6 of metal which may be clamped around the rope so as to be held against longitudinal movement thereof. These collars are adapted to engage against the rivets so as to reinforce the rope and prevent the same from pulling from the rivets. In addition to the fastening rivets 5, the jaws may be connected by an additional rivet 7 which is extended at right angles to the planes of the first rivets and engaged in the rope.

Each socket member has its jaws provided with longitudinal extensions 8 having elongated slots 9 therein which may be associated with similar slots 10 in the inner ends of extension plates 11, whereby to receive therewith connecting rivets 12. The clamping plates are also corrugated circumferentially to securely engage against the rope, and as illustrated other rivets 13 are passed through the companion extensions and through the rope.

From this construction, it is evident that if the strain to be applied to the belt is too great for the capacity of the socket members without the extension, the latter may be readily connected with the socket members and with the rope ends and thereby multiply the number of fastening connections between the device and the rope ends.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention, as claimed.

Having thus described my invention, what I claim is:—

1. A coupling for rope belts comprising identical socket members having rope receiving portions and interfitting loops, in combination with rope ends having fixed metallic collars embraced by the walls of the sockets and rivets extending through the sockets and through the rope ends and lying beside the collars and mutually contacting therewith.

2. A coupling for rope belts, comprising socket members for receiving the companion terminals of the belt, the said socket members being connected for relative angular movements, in combination with metallic collars on the rope ends embraced by the walls of the sockets and fastening devices extending through the sockets and through the rope ends and lying in mutual contact with surfaces of said collars.

3. A coupling for rope belts, comprising socket members for receiving the companion ends of the belt, said members being connected for relative angular movements, collars extending around the rope ends and embraced by the walls of the sockets, fastening devices extending through the sockets and through the rope ends and lying at the sides of the collars so as to hold the rope ends against longitudinal movements in the sockets, extensions carried by said members and provided with longitudinally extending sockets at their inner ends, devices extending through the sockets and through said socket members and rivets passing through said extensions and through the rope ends.

In testimony whereof I affix my signature in presence of two witnesses.

SAMUEL E. REAGLES.

Witnesses:
A. S. HAWLEY,
ADOLPH ANDRO.

---

Copies of this patent may be obtained for five cents each, by addressing the "Commissioner of Patents, Washington, D. C."